United States Patent [19]

Chiodini

[11] Patent Number: 5,610,615
[45] Date of Patent: Mar. 11, 1997

[54] METHOD AND DEVICE FOR MOBILE STATION POSITIONING BY MEANS OF A SATELLITE, AND ASSOCIATED TRANSMISSION METHOD

[75] Inventor: Alain Chiodini, Boulogne, France

[73] Assignee: Alcatel Mobile Communication France, Paris, France

[21] Appl. No.: 492,886

[22] Filed: Jun. 20, 1995

[30] Foreign Application Priority Data

Jun. 21, 1994 [FR] France .................... 94 07591

[51] Int. Cl.$^6$ .................................... G01S 5/02
[52] U.S. Cl. ............................ 342/357; 342/352
[58] Field of Search ..................... 342/352, 357, 342/354; 455/12.1

[56] References Cited

U.S. PATENT DOCUMENTS

| | | |
|---|---|---|
| 4,386,355 | 5/1983 | Drew et al. . |
| 4,819,053 | 4/1989 | Halavais .................... 342/353 |
| 5,161,248 | 11/1992 | Bertiger et al. ............ 455/17 |
| 5,548,801 | 8/1996 | Araki et al. ............... 455/13.1 |

FOREIGN PATENT DOCUMENTS

0250105A1  12/1987  European Pat. Off. .

OTHER PUBLICATIONS

*Proceedings of the IEEE*, vol. 60, No. 5, May 1972, New York US, pp. 564–571, Ehrlich, "The Role of Time–Frequency in Satellite Position Determination Systems".

Primary Examiner—Thomas H. Tarcza
Assistant Examiner—Dao L. Pham
Attorney, Agent, or Firm—Sughrue, Mion, Zinn, Macpeak & Seas

[57] ABSTRACT

A positioning method for a mobile station in the radio coverage area of a satellite entails determining the instantaneous distance between the satellite and the mobile station. The instantaneous elevation angle φ of the satellite is then calculated from the instantaneous distance, the altitude of the satellite and the radius of the Earth. The Doppler shift δ is then determined, after which the angle θ between the projections onto the surface of the Earth of the track of the satellite and a straight line segment passing through the satellite and the mobile station is calculated from the Doppler shift δ and the instantaneous elevation angle φ. The location of the mobile station is then determined from the instantaneous distance, the instantaneous elevation angle φ and the angle θ.

9 Claims, 4 Drawing Sheets

METHOD AND DEVICE FOR MOBILE STATION POSITIONING BY MEANS OF A SATELLITE, AND ASSOCIATED TRANSMISSION METHOD

BACKGROUND OF THE INVENTION

1. Field of the Invention

The field of the invention is that of positioning (i.e. determining the geographical location of) mobile stations using radiolocation techniques. These techniques enable a mobile station to determine its geographical location at any time using radio links between the mobile station and one or more reference points.

2. Description of the Prior Art

Many positioning systems exist already. They are essentially intended for maritime and aeronautical applications and use a specific transmission infrastructure such as a network of terrestrial transmitters (as in the OMEGA or LORAN C systems, for example) or a constellation of satellites (as in the TRANSIT system, for example).

The existing Global Positioning System (GPS) can be used in any type of mobile station. It uses a constellation of 24 satellites deployed in such a manner that a mobile station can receive signals from three separate satellites at any time. In the GPS system three satellites are required for positioning to be possible.

A major drawback of these prior art dedicated systems is that they require a very high investment in terms of transmission network installation and maintenance.

These infrastructure costs also impact on the positioning devices. Furthermore, these devices must include powerful and accurate computation means since they have to achieve an accuracy in the order of a few tens of meters.

This degree of accuracy is of benefit in some applications. There is, nevertheless, an entirely separate requirement for coarser positioning (for example, at the level of one cell in a cellular mobile radio network) at much lower cost. At present there is no system meeting this need.

One object of the invention is to meet this need and to alleviate the various drawbacks of the prior art.

To be more precise, one object of the invention is to provide a positioning method using a simplified satellite infrastructure. In other words, one object of the invention is to provide a positioning method requiring reception of signals from only one satellite (rather than from three satellites, as in the prior art systems).

Another object of the invention is to provide a method of this kind such that the design and manufacture of the positioning devices combine simplicity with low cost. In particular, one object of the invention is to provide a positioning method which can be implemented easily in mobile telephones.

A further object of the invention is to provide a positioning method which does not require a specific infrastructure but which can use an existing infrastructure such as the Globalstar network, for example.

SUMMARY OF THE INVENTION

These objects, and others that emerge below, are achieved in accordance with the invention by a positioning method for a mobile station in the radio coverage area of a satellite, comprising the following steps:

determining the instantaneous distance between said satellite and said mobile station;

calculating the instantaneous elevation angle $\phi$ of said satellite from said instantaneous distance, the altitude of said satellite and the radius of the Earth;

determining the Doppler shift $\delta$;

calculating the angle $\theta$ between the projections onto the surface of the Earth of the track of said satellite and a straight line segment passing through said satellite and said mobile station from said Doppler shift $\delta$ and said instantaneous elevation angle $\phi$; and determining the location of said mobile station from said instantaneous distance, said instantaneous elevation angle $\phi$ and said angle $\theta$.

Thus, in accordance with the invention, mobile station positioning is made possible using a single satellite by determining and using the Doppler shift.

Said step of calculating said angle $\theta$ advantageously comprises the following steps:

calculating the value of $\cos(\theta)$ from the Doppler shift equation:

$$\delta = v_s/c \cdot f_p \cdot \cos(\theta) \cdot \cos(\phi)$$

where:

$v_s$ is the speed of said satellite;
$c$ is the speed of light; and
$f_p$ is the carrier frequency of the transmitted signal; and resolving uncertainty as to the sign of said angle $\theta$.

The sign of $\theta$ varies according to whether the mobile station is on the right or on the left of the projection of the satellite track in the coverage area.

Resolving uncertainty as to the sign of $\theta$ is preferably made possible by adding the following steps to the method:

dividing said radio coverage area into two separate regions, a first of which corresponds to a positive value of $\theta$ and a second of which corresponds to a negative value of $\theta$; and assigning a separate synchronization signal to each of said regions.

In this case, said uncertainty resolving step comprises a step of analyzing the received synchronization signal to determine the region in which said mobile station is located and thereby the sign of $\theta$.

The separation between said regions is preferably defined by the track of said satellite.

Said step of determining said instantaneous distance advantageously comprises a step of measuring the transit time of a signal transmitted between said satellite and said mobile station.

Said step of determining said Doppler shift $\delta$ preferably uses a pilot signal comprising two juxtaposed temporally symmetrical signal elements of equal duration.

This method can be used in the context of a mobile radio service such as the Globalstar system.

The invention also consists in mobile station positioning devices utilizing the method as defined hereinabove and a method of transmitting digital signals from a satellite, comprising the following steps:

dividing said radio coverage area into two separate regions, one on each side of the track of said satellite; and assigning a different synchronization signal to each of said regions.

Other features and advantages of the invention will emerge from a reading of the following description of a preferred embodiment of the invention given by way of non-limiting illustrative example only and from the appended drawings.

BRIEF DESCRIPTION OF THE DRAWINGS

FIG. 6 shows the structure of a prior art pilot signal for a CDMA mobile radio system;

FIG. 7 shows the structure of a pilot signal for using this method of determining the Doppler shift, again for a CDMA mobile radio system;

FIG. 8 is a functional block diagram of a frequency and time synchronization device producing the FIG. 7 signal.

DETAILED DESCRIPTION OF THE PREFERRED EMBODIMENT

Mobile station positioning is one service proposed for future satellite mobile radio systems. On a more general level, satellite-based positioning is a technique with considerable growth potential. The invention proposes a new positioning method using signals received from only one satellite.

The embodiment of the invention described below is intended for use in the Globalstar system, which is a CDMA cellular mobile radio system offering global coverage. It comprises three segments:

the space segment, comprising 48 satellites in low Earth orbit (at 1 414 km altitude), eight back-up satellites and two constellation control centers, portable terminals installed on mobile stations or fixed stations, which are either mono-mode terminals (i.e. capable of interworking only with Globalstar) or bi-mode terminals (i.e. capable of interworking with Globalstar and a terrestrial cellular system such as the GSM or DCS 1800 system), connection stations which set up links to public switched networks and manage mobility, the latter function entailing the updating of databases indicating the present location of a mobile and the attributes of the services to which it has subscribed. This capacity enables integration into mobile networks. This enables bi-mode subscribers to retain their existing mobile phone number and to be called either from within the terrestrial network or from within the satellite network without having to do anything about it.

The basic Globalstar service is a telephone service. There is also provision for transmission of data. Globalstar will in the future offer a new service, namely extension of roaming worldwide. However, it is clear that this extension will be restricted to the service areas (i.e. outside dense conurbations in which coverage is in theory provided by a cellular network). Outside these service areas, a call request signal will be supplied by a one-way radiopaging service.

Because of its transparency and its integration into public networks, the Globalstar system will also be possible to offer the same services as the cellular networks.

The invention adds a further function to this system, namely mobile station positioning.

Figure 1:
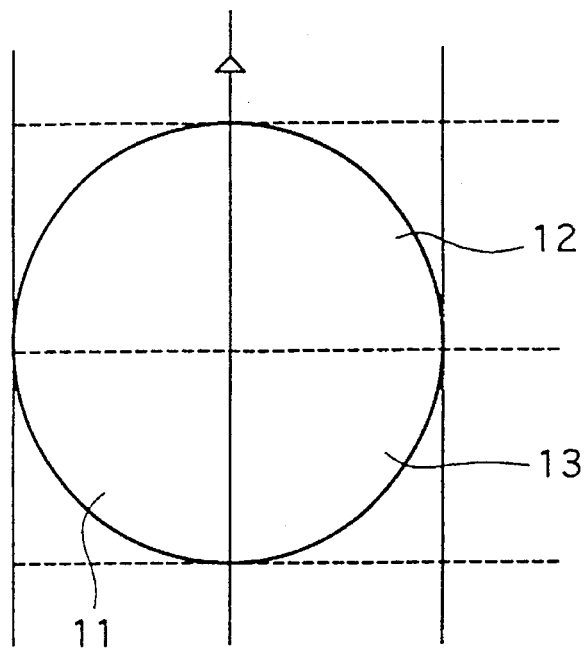
FIG. 1 is a diagram showing the radio coverage area of a satellite.

FIG. 1 shows the radio coverage area of the satellite. To a first approximation this is a disk 11 comprising a top half-disk 12 and a bottom half-disk 13.

The top half-disk 12 defines an area within which the signal received by the terminal from the satellite is affected by a positive Doppler shift (the satellite is moving towards the terminal).

The bottom half-disk 13 defines an area in which the signal received by the terminal from the satellite is affected by a negative Doppler shift (the satellite is moving away from the terminal).

The two half-disks 12 and 13 are defined by the null Doppler shift diameter 14 which is perpendicular to the track 15 of the satellite.

Figure 2:
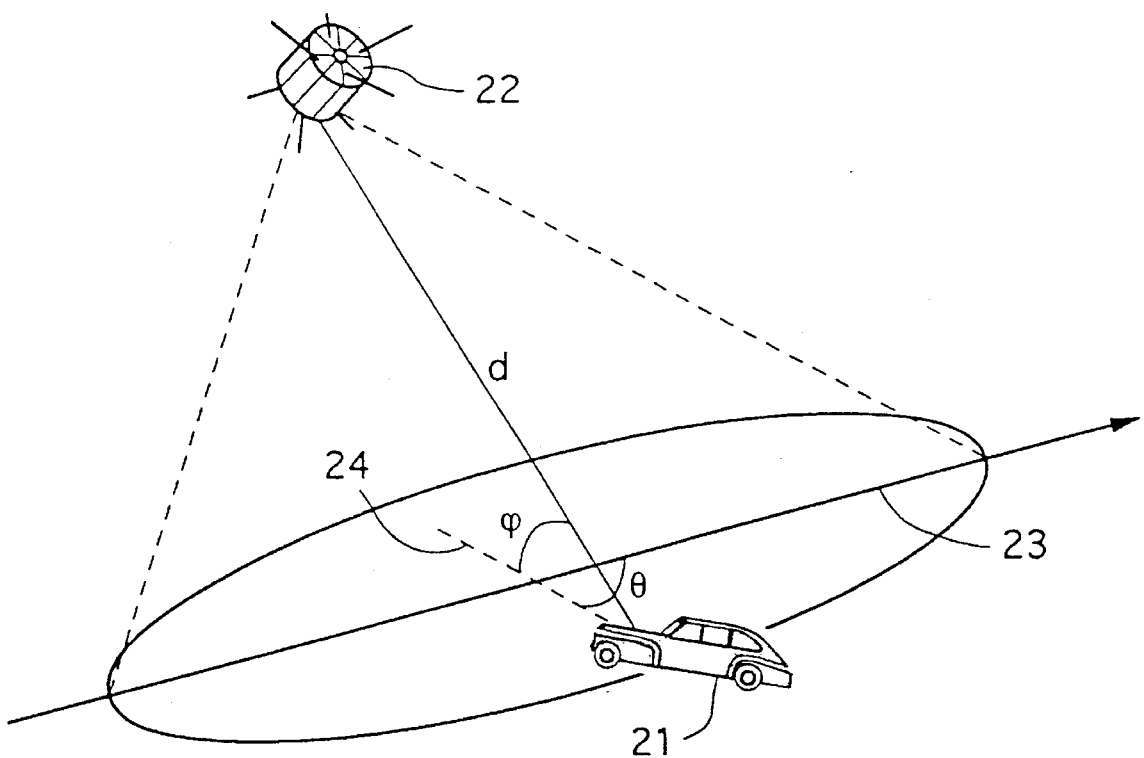
FIG. 2 shows three parameters d, φ and θ for positioning a mobile station relative to a satellite.

FIG. 2 shows the parameters needed for mobile station positioning in the known manner. Note that the invention is not specifically concerned with the positioning method as such, but with how the various parameters required are determined.

The instantaneous position of the mobile station 21 relative to the satellite 22 passing overhead is entirely defined by the following three parameters:

the instantaneous distance d between the satellite 22 and the mobile station 21;

the instantaneous elevation φ of the satellite 22 relative to the terminal 21;

the angle θ between the projections onto the surface of the Earth of the track 23 of the satellite and the satellite-terminal direction 24.

Figure 3:
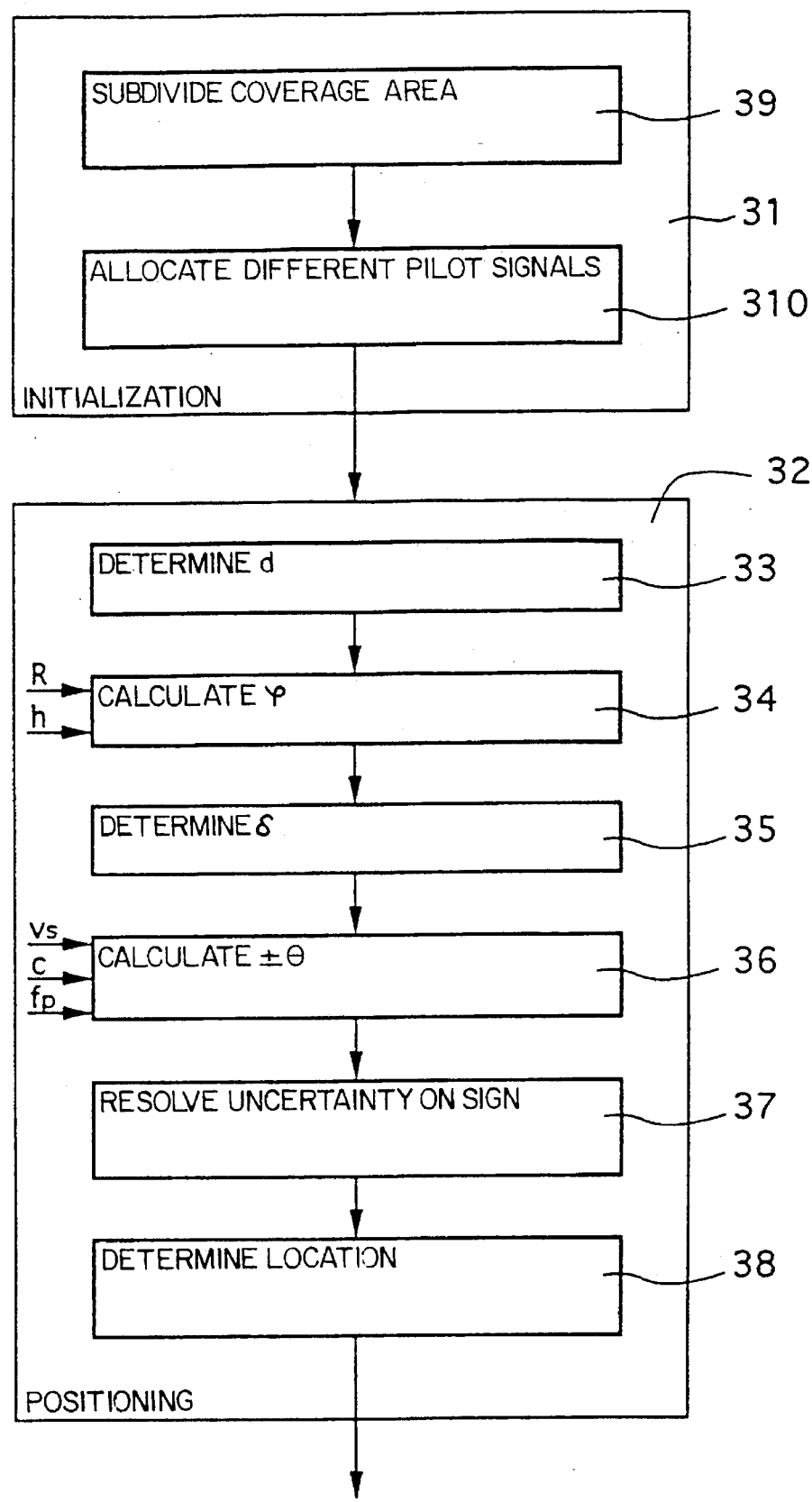
FIG. 3 is a flowchart of the positioning method of the invention.

In accordance with the invention, these parameters are determined by the method shown in FIG. 3.

This method comprises two types of processing. Firstly, initialization processing (31) carried out once and for all on board the satellite to resolve the uncertainty as to the sign of θ, as described below, and secondly positioning processing (32) which can be carried out at any time and by any mobile station equipped with the necessary processing means.

Mobile station positioning processing (32) in accordance with the invention thus entails determining the position of a mobile station from signals transmitted by a single satellite.

To this end, the first step 33 of the method determines the distance d between the satellite and the mobile station.

This distance can be determined in a conventional way, for example by measuring the transit time of a signal transmitted between the satellite and the terminal.

The next step (34) calculates the instantaneous elevation φ of the satellite relative to the terminal, from the value d, the radius R of the Earth and the altitude h of the satellite. The data R and h is known to the mobile terminal if the latter is responsible for all positioning processing. More generally, in this case, the ephemerides of the satellite used are known to the terminal.

To restrict the complexity of the terminal, most of the processing entailed in mobile station positioning can be carried out by the corresponding Earth station.

The Doppler shift δ is determined by the mobile station at the time of initial synchronization and at regular intervals thereafter. A method of determining the Doppler shift is described below.

In this method, the satellite transmits a pilot signal comprising temporally symmetrical signal elements, for example at least one pseudo-random first digital synchronization sequence x(0) through x(N−1) and, periodically, at least one second digital sequence x(N−1) through x(0) temporally symmetrical with (i.e. constituting a mirror image of) said first sequence.

Appropriate analysis of this signal structure recovers the timing reference of the base station and measures the Doppler shift.

The Doppler shift δ is defined by the equation:

$$\delta = v_s/c.fp. \cos(\theta). \cos(\phi) \qquad (1)$$

where:

$v_s$ is the speed of the satellite;

c is the speed of light;

$f_p$ is the carrier frequency.

The values of $v_s$, c and $f_p$ are known to the terminal. It is therefore possible (in step 36) to calculate cos (θ) from equation (1) and therefore to calculate the absolute value of θ.

Figure 4:
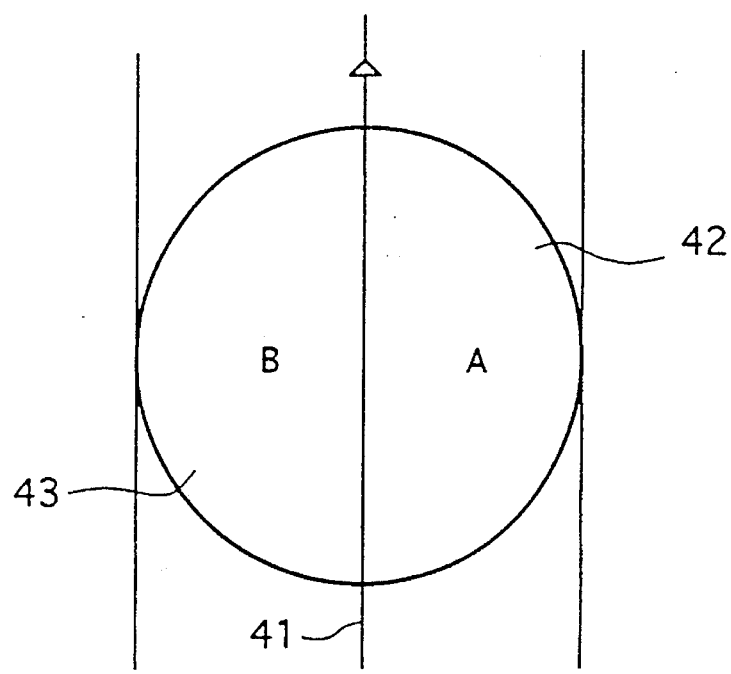
FIG. 4 shows the principle utilized by the invention to resolve uncertainty as to the sign of the instantaneous elevation angle.

There is therefore some uncertainty as to the sign of θ. In accordance with an important feature of the invention, this uncertainty can be resolved by using two specific pilot signals A and B and dividing the radio coverage area into two areas relative to the satellite track as shown in FIG. 4:

the synchronization signal A is transmitted only into the half-disk 42 on the righthand side of the track 41; and the synchronization signal B is transmitted only into the half-disk 43 on the lefthand side of the track 41.

Figure 5:
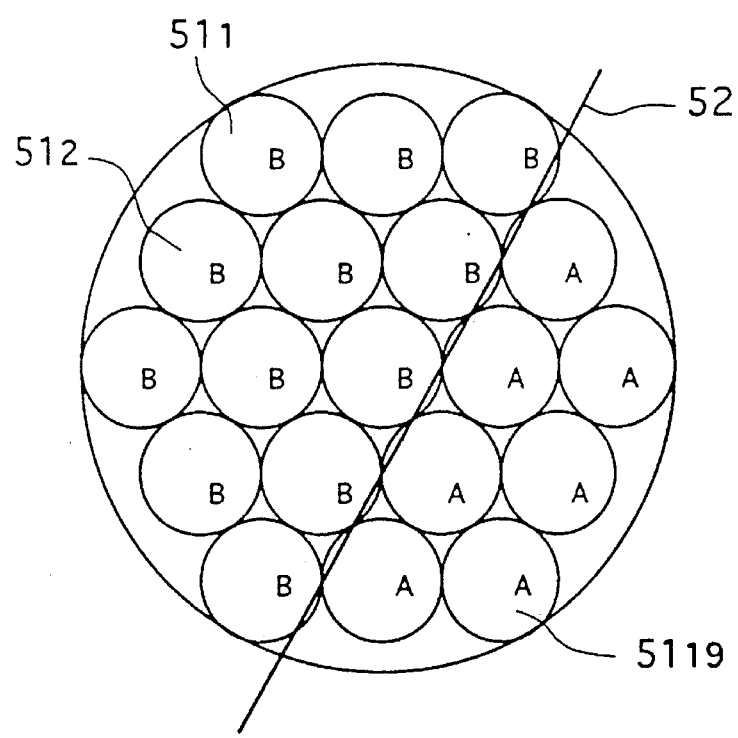
FIG. 5 shows a specific instance of the FIG. 4 principle corresponding to the Globalstar mobile radio system.

This corresponds to the initialization step (31), during which the coverage area is divided into two separate areas (39), to which different synchronization signals are assigned (310), the synchronization signals being known to the terminals, of course. In the specific case of the Globalstar system, the radio coverage area resembles a disk made up of 19 beams $51_1$ through $51_{19}$, in the manner shown in FIG. 5.

The pilot signals A and B are distributed in a similar manner, on either side of the track 52 of the satellite.

Accordingly, the positioning process (32) includes a step (37) of resolving the uncertainty as to the sign of θ by analyzing the frequency characteristics of the pilot signal received, enabling the terminal to determine in which of the half-disks 42 and 43 it is located.

The position of the mobile station can be determined (step 38) knowing the three values (θ, φ, δ), as previously mentioned.

This latter step is advantageously implemented by the Earth station. In this case, the role of the terminal is restricted to:

enabling measurement of the satellite/mobile station transit time by the Earth station;

measuring the Doppler shift (sign and absolute value);

determining which synchronization signal has been detected (A or B); and transmitting this information to the Earth station.

The Earth station can calculate the position of the mobile station from the known transit time, Doppler shift, detected synchronization signal, satellite ephemerides and radius of the Earth. The Earth station can transmit this position to the mobile station, if necessary.

A method of determining the Doppler shift is described next with reference to FIGS. 6 through 8.

Figure 6:
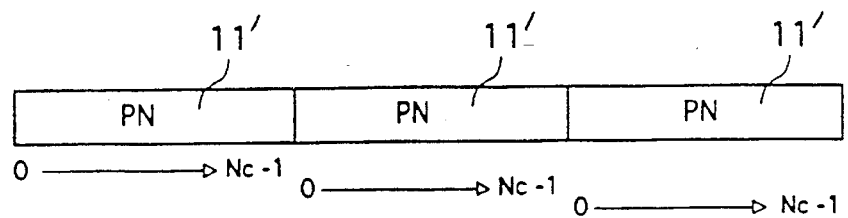
FIGS. 6 through 8 show a method of determining the Doppler shift.

FIG. 6 shows the structure of a pilot signal as used in a prior art CDMA system such as the Globalstar system. The pilot signal is formed by the continuous repetition of the same pseudo-random sequence (PN) 11' comprising a series of $N_c$ bits $12'_0$ to $12'_{N_c-1}$.

The sequence PN can be a sequence of 32 767 ($10^{15}-1$) bits supplied by an appropriate generator polynomial, for example. The receivers know the sequence and can therefore synchronize to the received signal. This refers to time synchronization. Frequency synchronization is effected independently, and no reliable information is available as to the Doppler shift.

Figure 7:
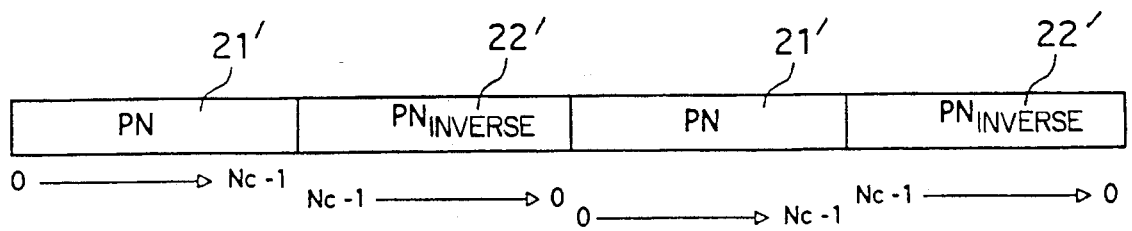

A new synchronization signal shown in FIG. 7 enables frequency and time synchronization of the receivers.

This signal still comprises a first (direct) sequence PN(n) 21' transmitted regularly. However, this first sequence 21' is replaced at regular intervals by a second (inverse) sequence $PN(N_c-1-n)$ 22' obtained from the first sequence PN by temporal symmetry.

The symmetrical second sequence can be obtained at the binary level (reversed order of binary reading) or directly at the modulated signal level.

It is inserted regularly into the pilot signal at a rate which depends on the needs of the system (in terms of the number of false detections and acceptable Doppler shift, for example). In the FIG. 7 embodiment the sequences transmitted are alternately the direct sequence 21' and the inverse sequence 22'.

Figure 8:
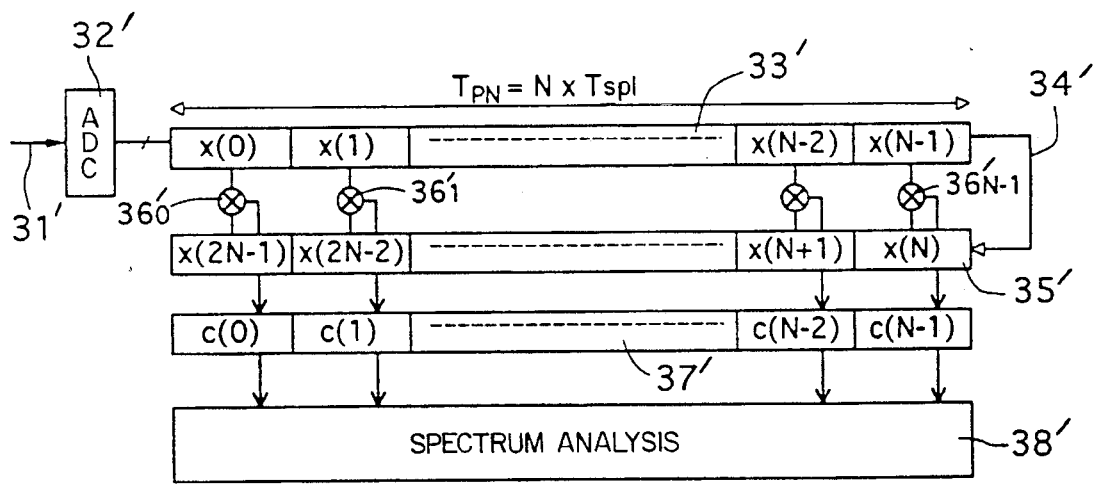

FIG. 8 is a diagrammatic representation of a synchronization device using the FIG. 7 signal.

The received pilot signal 31' is sampled by an analog-digital converter 32' which supplies samples x(i) with a sampling period $T_e$.

These samples are fed into a first shift register 33' with N cells (N is the length of the sequences PN). The sampling period is chosen so that $T_{PN}=N.T_e$ corresponds to the duration of the sequence PN.

The output of the register 33' is looped (34') to the input of a second shift register (35') so having N cells. Thus, at a given time:

the register 33' contains the samples x(0) through x(N−1); and the register 35' contains the samples x(N) through x(2N−1).

The device further comprises multiplier means $36'_0$ through $36'_{N-1}$ each of which multiplies the contents of two cells of the registers 33' and 35' to generate N coefficients c(i) 37' such that:

$$c(i) = x(i).x(2N-1-i)$$

with i varying from 0 through N−1.

These coefficients can be written as follows:

$$\begin{aligned} c(nT_e) &= \cos(2\pi\delta nT_e + \phi(nT_e)) \cdot \cos(2\pi\delta(2N-1-n)T_e + \\ &\quad \phi((2N-1-n)T_e)) \\ &= 1/2 \cdot \cos(2\pi\delta(2N-1-n)T_e + \phi(nT_e) + \\ &\quad \phi(2N-1-n)T_e)) + \\ &\quad 1/2 \cdot \cos(4\pi\delta nT_e - 2\pi\delta(2N-1-n)T_e + \\ &\quad \phi(nT_e) - \phi((2N-1-n)T_e)) \end{aligned}$$

When, at a given time, the shift register 33' contains a direct sequence exactly and the shift register 35' contains an inverse sequence exactly (this is referred to as "coincidence"), the following equality applies:

$$\phi(nT_e) = \phi[(2N-1-n)T_e]$$

The multiplier output signal is then:

$c(nT_c)=½ \cos(2\pi\delta(2N-1-n)T_c+2\phi(nT_c))+½ \cos(4\pi\delta nT-2\pi\delta(2N-1-n)T_c)$ It is a simple matter to verify that:

the first term is a spread spectrum signal; and the second term is a pure sinusoid, a function of $2\delta$.

When there is no coincidence, on the other hand, only a spread spectrum signal is obtained.

The sequence of coefficients from the multiplier is passed to spectrum analysis means 38'. Spectrum analysis at intervals $T_e$ enables, using conventional methods:

acquisition of the timing reference of the base station, as soon as coincidence occurs; and measurement of the Doppler shift, by measuring the frequency of the sinusoid which is equal to $2\delta$.

Note that it is not mandatory to insert the inverse sequence into the pilot signal. In a different embodiment of the invention, the inverse sequence can be transmitted on another frequency. In this case the pilot signal comprising only the direct sequence is transmitted continuously and the inverse sequence is transmitted at least periodically.

In this case, the device of FIG. 8 must naturally be adapted accordingly, the two shift registers being no longer in cascade but fed independently with each sequence.

More generally, different constructions of the device are feasible provided that the coefficients $c(i)$ are calculated and then analyzed.

There is claimed:

1. Positioning method for a mobile station in the radio coverage area of a satellite, comprising the following steps:

determining the instantaneous distance between said satellite and said mobile station;

calculating the instantaneous elevation angle $\phi$ of said satellite from said instantaneous distance, the altitude of said satellite and the radius of the Earth;

determining the Doppler shift $\delta$;

calculating the angle $\theta$ between the projections onto the surface of the Earth of the track of said satellite and a straight line segment passing through said satellite and said mobile station from said Doppler shift $\delta$ and said instantaneous elevation angle $\phi$; and determining the location of said mobile station from said instantaneous distance, said instantaneous elevation angle $\phi$ and said angle $\theta$.

2. Method according to claim 1 wherein said step of calculating said angle $\theta$ comprises the following steps:

calculating the value of $\cos(\theta)$ from the Doppler shift equation:

$$\delta=v_s/c.f_p. \cos(\theta).\cos(\phi)$$

where:

$v_s$ is the speed of said satellite;

c is the speed of light; and $f_p$ is the carrier frequency of the transmitted signal; and resolving uncertainty as to the sign of said angle $\theta$.

3. Method according to claim 2 further comprising the following steps:

dividing said radio coverage area into two separate regions, a first of which corresponds to a positive value of $\theta$ and a second of which corresponds to a negative value of $\theta$; and assigning a separate synchronization signal to each of said regions, and wherein said uncertainty resolving step comprises a step of analyzing the received synchronization signal to determine the region in which said mobile station is located and thereby the sign of $\theta$.

4. Method according to claim 3 wherein the separation between said regions is defined by the track of said satellite.

5. Method according to claim 1 wherein said step of determining said instantaneous distance comprises a step of measuring the transit time of a signal transmitted between said satellite and said mobile station.

6. Method according to claim 1 wherein said step of determining said Doppler shift $\delta$ uses a pilot signal comprising two juxtaposed temporally symmetrical signal elements of equal duration.

7. Method according to claim 1 wherein said satellite provides a mobile radio service.

8. Method according to claim 1 wherein said satellite conforms to the Globalstar system standards.

9. Mobile station positioning device utilizing the method according to claim 1.

\* \* \* \* \*